Aug. 6, 1929.  J. I. BOGGS  1,723,598
VEHICLE WHEEL CONSTRUCTION
Filed Oct. 6, 1927

Inventor
J. I. Boggs,

By Clarence A. O'Brien
Attorney

Patented Aug. 6, 1929.

1,723,598

UNITED STATES PATENT OFFICE.

JAMES ISACC BOGGS, OF TULSA, OKLAHOMA.

VEHICLE WHEEL CONSTRUCTION.

Application filed October 6, 1927. Serial No. 224,398.

My invention relates to improvements in vehicle wheel constructions, and the same pertains more particularly to a vehicle wheel construction, especially suitable for automobiles, wherein the same is demountable, for the convenient mounting or dismounting of automobile tire casings.

The prime object of my invention is to provide such a wheel construction which will be capable of almost instantaneous demountability, when it is desired to change the tire carried thereon.

Heretofore, considerable difficulty has been experienced in the changing of tires on motor vehicle wheels, due to the fact that a number of nuts must be removed, requiring in many cases, a severe manual strain in removing the tire from the rim.

An object thereof is to provide such a wheel construction which permits of its demountation without the use of tools.

Another object resides in such novel means which will allow the operation of removing the tire to be performed with considerable ease and convenience.

Another object resides in the fact that although the wheel construction permits of easy manipulation, the same is extremely safe-guarded against the possibility of a defect occurring therein.

Other objects and advantages will become apparent as the invention is better understood from the specification and claims to follow.

In the drawings:—

Referring now to the drawings, in which like numerals designate like parts—

Figure 1:
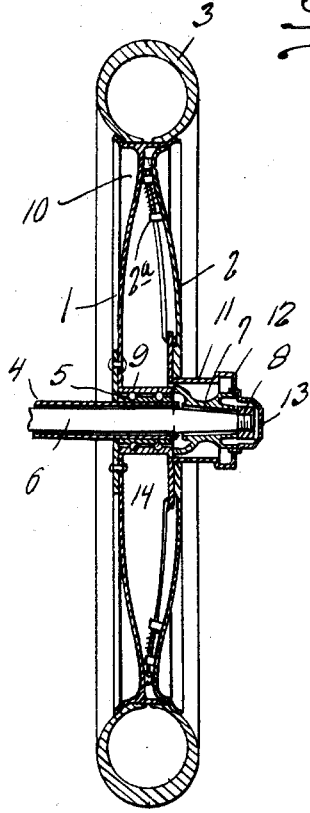
Figure 1 is a cross sectional view through the wheel construction, showing my demounting means.
Figure 2:
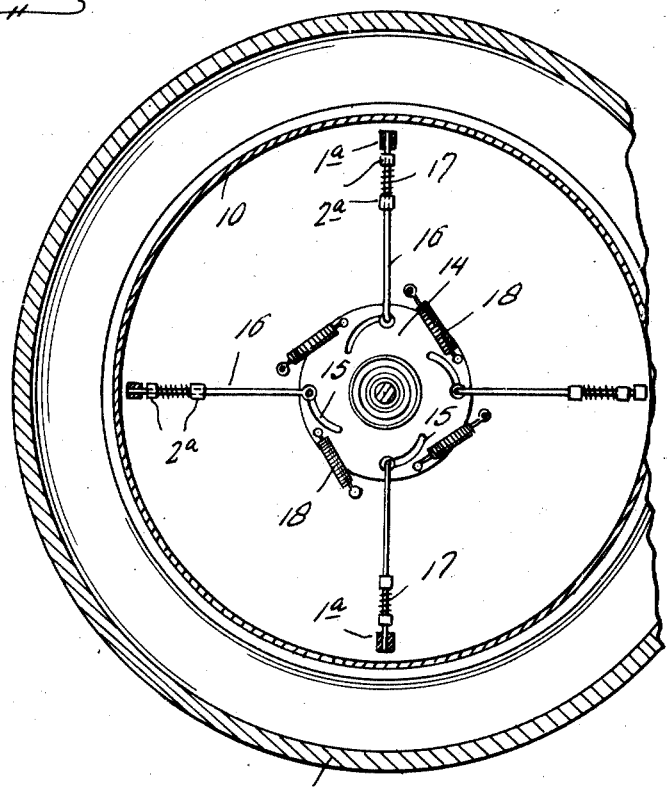
Fig. 2 is a fragmentary sectional view of the wheel structure.
Figure 3:
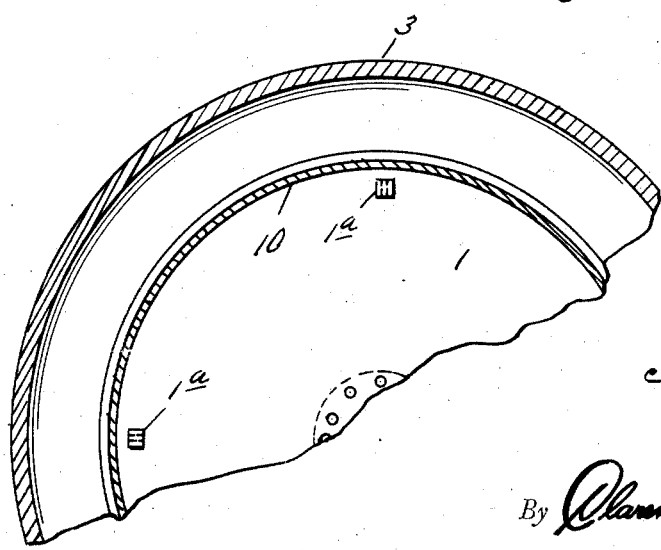
Fig. 3 is a fragmentary sectional view looking in the opposite direction from the arrows shown in Fig. 1.

Physically, my wheel construction consists of an inner wheel disk 1, and an outer wheel disk 2, and when the disks are locked in position, as shown in Fig. 1, of the drawing, they are adapted to have mounted thereon a tire 3 of a conventional type.

The disk 1 is formed with a central opening through which the axle housing 4 is adapted to project. Disposed around the portion of the housing projecting through the opening, is an annular collar 5 formed with suitable grooved ball bearing raceways. Adapted for disposition through the housing 4 and for extension beyond the end of the same, is the usual axle 6 with a suitable threaded portion at the end thereof.

The hub collar 7 is slidable up on the end portion of the axle, and adapted to be engaged at one end by a nut 8 threaded upon the threaded end portion of the axle. This engagement of the nut at one end is adapted to bear the opposite end of the collar against the annular flange 9 of the inner disk 1. This flange is associated in the usual manner with the collar 5, to provide the necessary bearing support for the wheel.

The outer periphery of the disk 1 is formed with a T-shaped flange construction 10, the edge portion of one of said flanges adapted to be bent upwardly to form the usual tire bead engaging flange, which is well known in automobile wheel rim constructions. Radially disposed lug members $1^a$ are carried at the inner side of the said disk, adjacent the outer edge portions thereof.

The outer disk 2 is provided with pairs of radially alined lugs $2^a$ on the inner surface thereof. The outer peripheral portion of said disk is flared outwardly to provide the opposite flange in complement with the flange of the disk 1, and between which the tire casing 3 is adapted to be retained. This disk is formed with an enlarged central opening thru which projects a tube 11, provided at one end thereof, with a suitable knob member 12, provided with an opening, and through which the usual hub cap 13 is adapted to project and associate with the hub collar 7.

The opposite end portion of the tube is adapted to rotate the annular plate 14, carried thereby. Formed adjacent the peripheral edge of the plate 14 is a plurality of arcuately shaped slots 15, said slots being formed in the plate eccentrically to the center thereof.

Rod members 16 are adapted to have one end portion thereof bent laterally for riding engagement within the arcuate slot in the annular collar 14. The opposite end portions are adapted to project through openings in the lug members $2^a$ on the inner surface of the outer disk. The extreme end portions of said rods are adapted for insertion within the lug $1^a$ of the inner disk. Coiled springs 17 are adapted to be disposed between the individual lug members comprising the pair of lugs 2ª arranged around the rod 16.

One end of each spring is adapted to engage one of the lugs, while the opposite end is adapted to be secured to the rod, to normally maintain the rod in an outwardly projected position. The spring members 17 having their ends connected to the annular plate 14 and disk 2 respectively, are extended to maintain them at the outward end portions of the slots 15.

To remove the tire casing 3 from the mounted position as shown in Fig. 1 of the drawings, the knob 12 at one end of the tube 11 is turned, thereby causing an annular movement of the plate 14. This movement of the plate 14, causes the laterally bent portions of the rods 16 to be drawn inwardly toward the inner end of the arcuate-shaped slot 15. This contractile movement of the rods 16 results in the disengagement of the outer ends thereof from the lug 1ª of the disk 1.

The rods 16 have thusly been disengaged from the lugs 1ª, the outer disk 2, may then be removed from its normal rotation with the disk 1. The tube and knob construction, permits the disk 2 to be removed without in any manner disturbing the cap 13. In mounting a casing upon the wheel, the casing is positioned upon the V-shaped construction of the disk 1, the disk 2 with the rod members 16, retained in contracted position, is positioned against the disk 1, where the rod members are then released allowing the outward ends thereof to engage in the lug members 1ª on the disk 1.

The coiled springs 17 and 18 respectively, are employed in connection with the rod members to normally maintain the frame in the projected position.

Having thus described my invention, what I claim as new is:—

1. In a demountable vehicle wheel construction comprising, a pair of discs, complementary lugs on the inner opposed faces of said discs, the openings of the lugs on one of said discs being registerable with the complementary lugs of the opposed discs, and slidable latch means on one of said discs, said latch means being operable for projection through the registered openings of the complementary lugs for securing said discs together.

2. In a demountable vehicle wheel construction comprising, a pair of discs, complementary lugs on the inner opposed faces of said discs, the openings of the lugs on one of said discs being registerable with the complementary lugs on the opposed discs, and slidable latch means on one of said discs, said latch means being operable for projection through the registered openings of the complementary lugs for securing said discs together, and eccentric means for operating said latches.

3. In a demountable vehicle wheel construction comprising a pair of discs, complementary lugs on the inner opposed faces of said discs, the openings of the lugs on one of said discs being registerable with the complementary lugs on the opposed discs, and slidable latch means on one of said discs, said latch means being operable for projection through the registered openings of the complementary lugs for securing said discs together, and eccentric means for operating said latches, said eccentric means consisting of a tubular member arranged over the usual hub portion of the wheel and projecting centrally through the outer discs, a circular plate at the inner end of the tube and being adapted for rotation by said tube, the end of said latches being adapted to ride in eccentrically formed slots in the circular plate, and means at the outer end of the tube, whereby the same may be rotated for actuating the latches.

In testimony whereof I affix my signature.

JAMES ISACC BOGGS.